United States Patent Office 3,398,203
Patented Aug. 20, 1968

3,398,203
PROCESS FOR THE PREPARATION OF
FLUORINATED HYDROCARBONS
Danford H. Olson, Woodriver, Ill., assignor to Marathon Oil Company, Findlay, Ohio, a corporation of Ohio
No Drawing. Filed Aug. 1, 1966, Ser. No. 569,022
7 Claims. (Cl. 260—653.3)

ABSTRACT OF THE DISCLOSURE

The present invention comprises a process for the fluorination of lower molecular weight acyclic aliphatic hydrocarbons free from acetylenic bonds comprising in combination the steps of contacting said hydrocarbons with hydrogen fluoride and oxygen in the presence of an effective amount of copper fluoride dissolved in an eutectic mixture having a melting point above about 300° C. and less than 500° C. and a vaporization point under the reaction conditions greater than 600° C., said eutectic mixture comprising at least two inorganic metal fluorides, in a reaction zone having a temperature above the melting point of said eutectic mixture and below 600° C., and wherein the inorganic metal fluorides are selected from the group consisting of alkali metal fluorides and alkaline earth metal fluorides.

---

The present invention relates to new methods for the preparation of fluorinated hydrocarbons and, in particular relates to processes for the preparation of such compounds from lower aliphatic acyclic hydrocarbons by reaction with cupric fluoride.

The fluorides of lower (1 to 6 carbon atoms) aliphatic acyclic compounds have a variety of utilities including use as refrigerants, solvents, rocket fuels, and starting materials for chemically resistant plastics. Because hydrogen fluoride does not react readily with these lower hydrocarbons to give the desired organic fluorides, most such organic fluorides are produced by the reaction of hydrogen fluoride with the corresponding organic chlorides. Such halogen exchange reactions require numerous steps and produce as a by-product, low valued hydrochloric acid, generally an aqueous solution. Because of these disadvantages of the hydrogen exchange reactions, various attempts have been made to fluorinate organic compounds by oxyfluorination techniques. The literature indicates that such direct oxyfluorinations have not been successful in producing the desired organic fluoride in commercial feasible yields. (See U.S. 2,578,913, Example IV.) Oxyfluorination yields have been enhanced by the addition of promoting agents, e.g., the hydrogen bromide of U.S. 2,578,913, but the use of such promoters increases costs and purification requirements and may, in some cases, where halide-containing promoters are utilized, merely represent a return to modified halogen exchange reactions.

In its simplest aspect, the present invention involves the reaction of cupric fluoride with a lower acyclic aliphatic hydrocarbon to form a fluoride of the hydrocarbon. For example, according to the present invention, ethane reacts with cupric fluoride according to the following equation:

$$2CuF_2 + C_2H_6 \rightarrow 2CuF + C_2H_5F + HF$$

The cuprous fluoride may be regenerated to cupric fluoride by treatment with fluorine (which is not economical because of the high cost of this element) or, according to the preferred embodiment of the present invention, by treatment with HF and oxygen which probably form first $CuC \cdot CuF_2$, which in turn reacts with HF to form cupric fluoride. This regeneration reaction is preferably conducted simultaneously with the reaction between the cupric fluoride and the hydrocarbon. The CuF may be removed from the reaction zone or more preferably the $CuF_2$ may be continuously replenished in situ by feeding approximately stoichiometric quantities of HF and oxygen into the reaction zone with the hydrocarbons to be fluorinated.

As demonstrated in Example VII, this process occurs affording low conversion levels, requiring a number of passes of starting materials. To enhance conversions, the cupric fluoride is preferably mixed with the eutectic metal fluoride mixture which is intimately contacted with the vaporized lower aliphatic acyclic hydrocarbons.

The eutectic metal fluoride mixtures of the present invention should have melting points below about 500° C. and should have a vaporization point, (i.e., boiling point or decomposition point) above about 600° C. The preferred metal fluorides are the fluorides of the alkali metals, i.e., potassium, sodium, lithium, rubidium, cesium, and francium (the first three being especially preferred) and the fluorides of the alkaline earth metals, i.e., the divalent metals of Group II of the Periodic Table, beryllium, magnesium, calcium, strontium, barium and radium (beryllium, calcium, and barium being most preferred). While the above alkaline metal and alkaline earth metal fluorides are most preferred for the purposes of the present invention, it should be understood that other metal fluoride eutectics may be utilized. Some of the preferred eutectic compositions are listed in Table 1. The precise compositions shown, while they are most preferred in order to provide the minimum melting point, need not be absolutely adhered to. For example, the numbers in parentheses indicate ranges which may be employed in most cases with the present invention.

In most cases, the eutectic mixtures are attained by simply melting together the metal fluoride or by mixing together other salts of the metals for later fluorination as mentioned above. The cupric fluoride will be added in catalytic amounts, preferably will constitute at least about 1% of the eutectic composition, and most preferably the eutectic composition will be saturated with cupric fluoride. That is, the cupric fluoride will be added to the eutectic mixtures shown in Table 1 until cupric fluoride precipitates or the salt mixtures solidifies.

Temperatures and pressures for the reaction of the cupric fluoride with the hydrocarbons, according to the present invention, are not narrowly critical, but will preferably range from about 300 to about 600° C. and 0.1 to 10,000 atmospheres absolute, more preferred ranges are 400 to 500° C. and 0.8 to about 8 atmospheres absolute, respectively.

The reaction is preferably conducted in the vapor phase and conventional gas-liquid contact methods may be used. For example, the liquid cupric fluoride-eutectic metal fluoride mixture can be dispersed on an inert support, e.g., sintered metals such as nickel, or may be placed in a reaction zone which is packed with conventional rings or other high surface area packing. In the latter case, the gas velocities will preferably be adjusted so that the cupric fluoride-eutectic metal mixtures will be alternately carried up the packed bed as a spray and will then run down over the surface of the packing in the reaction zone. Where desirable, the liquid cupric fluoride mixtures may be recirculated by high temperature corrosion resistant pumps, e.g. submerged pumps manufactured from Monel or nickel. In some instances it may be desirable to accomplish the regeneration of the cupric fluoride at a point remote from the reaction zone, e.g., by employing a moving bed in which the cupric fluoride-containing liquids move through the reaction zone and are then recycled to a regeneration zone where they are contacted with oxygen and HF in somewhat the manner of a fluid catalytic cracker.

While not narrowly critical, the contact times between the cupric fluoride-containing liquid of the present invention and the hydrocarbons to be fluorinated will generally be from about 0.01 to about 10,000 seconds with times of from 0.5 to about 500 seconds being more preferred, and contact times of about 1 to about 200 seconds being most preferred. Such contact times may be readily provided by adjusting flow velocities and tower lengths as necessary.

Temperatures, pressures, contact times and other operating variables may be readily optimized for the particular hydrocarbons to be fluorinated and for the particular degree of fluorination to be accomplished by making routine trial runs.

As mentioned previously, the cupric fluoride may be regenerated by contacting the cuprous fluoride-containing liquid mixtures with hydrogen fluoride and oxygen. This can be accomplished in zones remote from the reaction zone in which the fluorination of the hydrocarbon takes place, or alternatively, the fluorination of the hydrocarbon and the regeneration of the cupric fluoride can take place simultaneously in the same reaction zone by passing oxygen, hydrogen fluoride and hydrocarbon concurrently into the reaction zone. In such concurrent fluorination-regeneration type embodiments of the invention, the oxygen, hydrogen fluoride and hydrocarbon can be present in rather widely varying molar ratios, preferably from 0.1 to about 10 times the stoichiometric quantity of each, and more preferably from 0.5 to about two times the stoichiometric quantity of each. The molar ratios likely will, of course, be governed to a large extent by the degree of fluorination which is desired in the fluorinated hydrocarbon.

It should be understood that the present invention is susceptible to a wide variety of modifications and variations and that the examples which follow are to be taken as being merely illustrative of some of such variations and modifications. For example, the porous catalyst supports and related techniques which are taught by co-pending application, Ser. No. 513,093, filed Dec. 10, 1965 and assigned to the assignee of the present invention, are applicable. The scope of the present invention is to be delineated only by the claims appended hereto.

EXAMPLE I

A catalyst is prepared by immersing 4-8 mesh fused alumina in a molten bath of cupric fluoride at 1000° C. The excess cupric fluoride is drained off and the catalyst contained 50 grams of cupric fluoride per 100 grams of alumina.

EXAMPLE II

A mixture of beryllium fluoride (62 mole percent), and potassium fluoride is heated to 400° C. This combination comprises a eutectic mixture with a melting point of 340° C. (M. P. Borzenkova et al., J. Inorg. Chem., U.S.S.R., 1956, 143). Anhydrous cupric fluoride is added to the molten mixture such that the cupric fluoride did not precipitate and the mixture remained molten at 400° C. Fused alumina is impregnated with the molten salt as in Example I to give a catalyst which contained 48 grams of salt per 100 grams of support.

EXAMPLE III

Using a eutectic mixture of beryllium fluoride (52 mole percent) and lithium fluoride at 425° C. containing cupric fluoride as per Example II fused alumina is impregnated to give a catalyst containing 48 grams of salt per 100 grams of support. The melting point of the eutectic mixture is 356° C. (W. E. Counts and E. F. Osborn, J. Am. Ceram. Soc., 36, 12 (1953)).

EXAMPLE IV

Similar to Examples II and III, the following eutectic mixtures containing cupric fluoride were used to prepare catalysts:

AgF (86 mole percent) $ZnF_2$ M.P. 380° C. [R. C. De Vries, J. Am. Chem. Soc., 75 2479 (1953)].

$BeF_2$ (48 mole percent) KF M.P. 405° C. [M. P. Borzenkova et al.].

$BaF_2$, mole ratio 1.78; KF, 41.2; LiF, 45.7; NaF, 11.3 M.P. 438° [V. T. Berezhnaya, Zhur. Neorg. Khim., 6, 687 (1961)].

$CaF_2$, mole ratio 1.5; KF, 41.2; LiF, 45.6; NaF, 11.7 M.P. 444° C. [G. A. Bukhalova, J. Inorg. Chem., U.S.S.R., 5, 218 (1960)].

KF, mole ratio 42; LiF, 46.5; NaF, 11.6 M.P. 454° C. [V. T. Berezhnaya].

EXAMPLE V

The catalyst of Example I is placed in a Monel reactor such that the reactor contains 75 grams of cupric fluoride and the reactor heated to 450° C. Ethylene is passed through the reactor such that the contact time is 2.5 seconds and the effluent gases passed through a water scrubber to remove HF and then collected in a gas burette. The recovered gases were analyzed on a specially constructed gas chromatograph and contained, in addition to unreacted ethylene, vinyl fluoride, and 1,2-difluoroethane.

EXAMPLE VI

The catalyst of Example II (150 grams) was placed in a Monel reactor and heated to 400° C. A mixture of ethylene, hydrogen fluoride, and air is passed over the catalyst in the mole ratio $C_2H_4:HF:O_2$ of 1:4:0.5. The contact time was 2.0 seconds. The unreacted HF is removed by a water scrubber and the gases collected in a gas burette. Analysis of the gas showed ethylene, carbon dioxide, carbon monoxide, 1,2-difluoroethane, and vinyl fluoride.

EXAMPLE VII

Twenty five grams of $CuF_2$ was mixed with 50 grams of fused alumina in a 316 S. S. reactor. The reactor was heated to 450° C. to drive off adsorbed $H_2O$. Anhydrous HF was then fed to the reactor at 450° to convert CuO present in the $CuF_2$ to $CuF_2$. The HF was efficiently absorbed until the regeneration was complete. The reactor was purged with pure $N_2$. Ethylene, 700 cc. was fed during seven minutes to the reactor at 450° C. The reactor was then purged with $N_2$ to remove product gases. The product gases were collected in a gas burette and analyzed by gas chromatography. The gas analysis showed (excluding $N_2$ which was the purge gas) 92.3 volume percent ethylene, 1.9% vinyl fluoride, 1.9% 1,2-difluoroethane, and 2.0% of six other unidentified fluorocarbons.

This example demonstrates that although $CuF_2$ can react directly with hydrocarbons, it is very inefficient. The inefficiency is the result of $CuF_2$ being a solid which allows only reaction on its surface. According to the preferred operation of the present invention the $CuF_2$ is present in a liquid state dissolved in a non-reactive molten salt which allows increased availability of the $CuF_2$ and provides increased reactivity.

EXAMPLE VIII

When the catalyst of Example II is reacted according to the procedures and starting materials of Example VII, the products of Example VII are obtained in substantially enhanced conversions.

3. The process of claim 1 in which the hydrocarbons are selected from the group consisting of methane, ethane, propane, ethylene, and propylene.

4. The process of claim 1 in which the hydrocarbons are selected from the group consisting of methane, ethane, propane, ethylene, and propylene.

5. The process of claim 2 in which the hydrocarbons are selected from the group consisting of methane, ethane, propane, ethylene, and propylene.

TABLE 1.—EUTECTIC MIXTURES
[Mole ratios of metal fluorides]

| Ag | Zn | K | Na | Li | Be | Mg | Ca | Ba | Melting Point, °C. | Reference |
|---|---|---|---|---|---|---|---|---|---|---|
|  |  | 38 (36–40) |  |  | 62 (50–64) |  |  |  | 340 | 1 |
|  |  |  |  | 48 (46–50) | 52 (50–54) |  |  |  | 356 | 2 |
| 86 (85–87) | 14 (13–15) |  |  |  |  |  |  |  | 380 | 3 |
|  |  |  | 52 (50–54) |  | 48 (46–50) |  |  |  | 405 | 1 |
|  |  | 41.2 (39–43) | 11.3 (10.5–12) | 45.7 (43–48) |  |  |  | 1.78 (1.6–1.9) | 438 | 4 |
|  |  | 41.2 (39–43) | 11.7 (10.5–12) | 45.6 (43–48) |  |  | 1.5 (1.4–1.6) |  | 444 | 5 |
|  |  | 42 (40–44) | 11.6 (10.5–12) | 46.5 (44–48.5) |  |  |  |  | 454 | 4 |

References: 1—M. P. Borzenkova, et al. *J. Inorg. Chem.*, U.S.S.R., *1956*, 143. 2—W.E. Counts and E. F. Osborn, *J. Am. Ceram. Soc.*, 36, 12 (1953). 3—R. C. Devries, *J. Am. Chem. Soc.*, 75, 2479 (1953). 4—V. T. Berezhnaya, *Zhur. Neorg. Khim*, 6, 687 (1961). 5—G. A. Bukhalova, *J. Inorg. Chem.* U.S.S.R., 5, 218 (1960).

What is claimed is:

1. A process for the fluorination of lower molecular weight acyclic aliphatic hydrocarbons free from acetylenic bonds comprising in combination the steps of contacting said hydrocarbons with hydrogen fluoride and oxygen in the presence of an effective amount of copper fluoride dissolved in a eutectic mixture having a melting point above about 300° C. and less than 500° C., and a vaporization point under the reaction conditions greater than 600° C., said eutectic mixture comprising as least two inorganic metal fluorides, in a reaction zone having a temperature above the melting point of said eutectic mixture and below 600° C., and wherein the inorganic metal fluorides are selected from the group consisting of alkali metal fluorides and alkaline earth metal fluorides.

2. The process of claim 1 wherein the eutectic mixture of inorganic metal fluorides consists essentially of a mixture of beryllium fluoride with potassium fluoride.

6. The process of claim 5 wherein the eutectic mixture consists essentially of the following constituents in the following mole ratios: barium fluoride 1.6 to about 1.9; potassium fluoride 39 to about 43; lithium fluoride about 43 to about 48; sodium fluoride about 10.5 to about 12.

7. The process of claim 5 wherein the inorganic eutectic mixture consists essentially of the following constituents in the following mole ratios: potassium fluoride from about 40 to about 44; lithium fluoride from about 44 to about 49; sodium fluoride from about 10 to about 13.

References Cited

FOREIGN PATENTS 971,995  10/1964  Great Britain.

DANIEL D. HORWITZ, *Primary Examiner.*